(12) United States Patent
Lutz

(10) Patent No.: US 11,963,479 B2
(45) Date of Patent: Apr. 23, 2024

(54) BLADES AND KNIVES FOR AGRICULTURAL MACHINES HAVING A TOOTHING BEING VARIED ALONG A LENGTH

(71) Applicant: Gebrueder Busatis Gesellschaft m.b.H., Purgstall an der Erlauf (AT)

(72) Inventor: Wolfgang Lutz, Wieselburg (AT)

(73) Assignee: Gebrüder Busatis Gesellschaft m.b.H., Purgstall an der Erlauf (AT)

( * ) Notice: Subject to any disclaimer, the term of this patent is extended or adjusted under 35 U.S.C. 154(b) by 396 days.

(21) Appl. No.: 17/064,658

(22) Filed: Oct. 7, 2020

(65) Prior Publication Data

US 2021/0100164 A1 Apr. 8, 2021

(30) Foreign Application Priority Data

Oct. 8, 2019 (AT) .............................. A 50852/2019

(51) Int. Cl.
| | | |
|---|---|---|
| *A01D 34/73* | (2006.01) | |
| *A01D 41/14* | (2006.01) | |
| *A01F 12/40* | (2006.01) | |
| *A01F 29/02* | (2006.01) | |
| *A01F 29/09* | (2010.01) | |

(52) U.S. Cl.
CPC ........... *A01D 34/736* (2013.01); *A01D 41/14* (2013.01); *A01F 12/40* (2013.01); *A01F 29/02* (2013.01); *A01F 29/095* (2013.01)

(58) Field of Classification Search
CPC ...... A01D 34/736; A01D 41/14; A01D 90/04; A01D 34/14; A01D 1/06; A01D 33/06; A01D 34/13; A01F 12/40; A01F 29/02; A01F 29/095; A01F 2015/108; A01F 29/00; B02C 18/18; B21D 53/64; B21D 53/72
See application file for complete search history.

(56) References Cited

U.S. PATENT DOCUMENTS

| | | | | |
|---|---|---|---|---|
| 90,593 | A * | 5/1869 | Simonds | A01D 34/14 76/89.1 |
| 513,834 | A * | 1/1894 | Smith | A01D 34/13 30/225 |
| 1,848,651 | A * | 3/1932 | Peeler | A01B 1/12 172/380 |
| 2,141,504 | A * | 12/1938 | Balfour | B23D 61/121 83/846 |

(Continued)

FOREIGN PATENT DOCUMENTS

| | | | |
|---|---|---|---|
| CN | 106688341 A | 5/2017 | |
| DE | 2757353 A * | 7/1979 | ............. B02C 18/20 |

(Continued)

*Primary Examiner* — Arpad Fabian-Kovacs
(74) *Attorney, Agent, or Firm* — Laurence A. Greenberg; Werner H. Stemer; Ralph E. Locher

(57) ABSTRACT

A knife and blade for agricultural machines, in particular mower knife blades, straw chopper knives, corn header knives, feed mixer knives, loader wagon knives and baler knives, has at least one toothed cutting edge extending from a cutting edge beginning to a cutting edge end on a blade surface. The cutting edge has a straight or curved configuration and the blade surface has a mounting section. The toothing of the cutting edge is varied along its length with regard to the tooth pitch and/or the tooth geometry.

3 Claims, 5 Drawing Sheets

(56) References Cited

U.S. PATENT DOCUMENTS

| | | | | |
|---|---|---|---|---|
| 2,568,870 | A * | 9/1951 | Ronan | B23D 61/121 |
| | | | | 83/846 |
| 2,598,091 | A * | 5/1952 | Ahlgrim | A01D 34/67 |
| | | | | 56/16.7 |
| 2,767,543 | A * | 10/1956 | Ream | A01D 34/53 |
| | | | | 56/289 |
| 3,066,468 | A | 12/1962 | Kowalik et al. | |
| 3,855,892 | A * | 12/1974 | DiLello | B23D 1/12 |
| | | | | 83/835 |
| 4,290,326 | A * | 9/1981 | Ibach | A01D 34/18 |
| | | | | 72/352 |
| 5,142,853 | A | 9/1992 | Routery | |
| 5,823,449 | A | 10/1998 | Kooima et al. | |
| 6,857,255 | B1 * | 2/2005 | Wilkey | A01D 34/13 |
| | | | | 56/296 |
| 7,124,567 | B1 * | 10/2006 | Adamson | A01D 34/14 |
| | | | | 56/DIG. 17 |
| 7,503,162 | B2 | 3/2009 | Herlyn et al. | |
| D729,599 | S * | 5/2015 | Talbot | D8/20 |
| 9,079,259 | B2 * | 7/2015 | Grolimund | B23D 61/021 |
| 11,071,255 | B2 * | 7/2021 | Derscheid | A01D 90/04 |
| 2005/0166566 | A1 * | 8/2005 | Majkrzak | A01D 34/14 |
| | | | | 56/246 |
| 2006/0130630 | A1 * | 6/2006 | Hesselberg | B23D 61/121 |
| | | | | 83/846 |
| 2007/0180972 | A1 * | 8/2007 | Lowder | B23D 61/021 |
| | | | | 83/835 |
| 2007/0251372 | A1 * | 11/2007 | Petts | B23D 61/021 |
| | | | | 83/846 |
| 2008/0121079 | A1 * | 5/2008 | Hashimoto | B23D 61/123 |
| | | | | 83/14 |
| 2008/0173001 | A1 * | 7/2008 | Herlyn | A01D 34/14 |
| | | | | 56/296 |
| 2009/0013847 | A1 * | 1/2009 | Lauzet | B23D 61/121 |
| | | | | 83/846 |
| 2009/0293698 | A1 * | 12/2009 | Tran | B23D 61/121 |
| | | | | 83/846 |
| 2010/0050587 | A1 * | 3/2010 | Stoffel | A01D 34/14 |
| | | | | 56/300 |
| 2013/0111863 | A1 * | 5/2013 | Johnson | A01D 34/736 |
| | | | | 56/10.1 |
| 2014/0069249 | A1 * | 3/2014 | Collins | B24B 3/586 |
| | | | | 83/651 |
| 2014/0373501 | A1 * | 12/2014 | McLawhorn | A01F 29/09 |
| | | | | 56/500 |
| 2016/0073582 | A1 * | 3/2016 | Stoffel | B23K 26/34 |
| | | | | 219/76.1 |
| 2019/0000018 | A1 | 1/2019 | Klein et al. | |
| 2019/0240753 | A1 * | 8/2019 | Jukes | B23D 61/121 |
| 2019/0262919 | A1 | 8/2019 | Mattes | |
| 2019/0364726 | A1 * | 12/2019 | Schuler | A01D 34/04 |
| 2020/0329635 | A1 * | 10/2020 | Smith | A01D 34/14 |
| 2021/0068340 | A1 * | 3/2021 | Herter | A01D 34/404 |

FOREIGN PATENT DOCUMENTS

| | | | | |
|---|---|---|---|---|
| DE | 2831690 | A * | 1/1980 | B02C 18/20 |
| DE | 8617670 | U1 | 12/1986 | |
| DE | 20317848 | U1 * | 3/2004 | B26B 9/02 |
| DE | 102013007302 | A1 | 10/2014 | |
| EP | 1946630 | A1 | 7/2008 | |
| EP | 2641706 | A1 * | 9/2013 | B02C 18/20 |
| EP | 3420804 | A1 | 1/2019 | |
| EP | 3578027 | A1 | 12/2019 | |
| EP | 3539368 | B1 * | 3/2021 | A01D 45/00 |
| FR | 901425 | A | 7/1945 | |
| JP | H0531623 | A | 2/1993 | |
| JP | H0633421 | U * | 4/1994 | A01D 34/73 |
| JP | 3140635 | U * | 4/2008 | A01D 34/73 |
| NL | 6918968 | A * | 6/1970 | B02C 18/20 |
| WO | 2018024854 | A1 | 2/2018 | |

* cited by examiner

BLADES AND KNIVES FOR AGRICULTURAL MACHINES HAVING A TOOTHING BEING VARIED ALONG A LENGTH

CROSS-REFERENCE TO RELATED APPLICATION

This application claims the priority, under 35 U.S.C. § 119, of Austrian patent application A50852/2019, filed Oct. 8, 2019; the prior application is herewith incorporated by reference in its entirety.

BACKGROUND OF THE INVENTION

Field of the Invention

The invention relates to blades and knives for agricultural machines, in particular mower knife blades, straw chopper knives, corn header knives, feed mixer knives, loader wagon knives and baler knives, having at least one toothed cutting edge extending from a cutting edge beginning to a cutting edge end on a blade surface, the cutting edge having a straight or curved configuration and the blade surface having a mounting section. Preferably, these machines are finger cutting devices for combine harvesters or other mowers, straw choppers for combine harvesters, corn headers for self-propelled forage harvesters, feed mixers and cutting devices for loader wagons and balers.

For all these mentioned exemplary machines, knives are used in order to chop or cut off the most diverse types of materials. The knives and their blades have the most diverse forms, which are adapted to the structure of the machine and the material to be cut.

European patent EP 1 946 630 B1, corresponding to U.S. Pat. No. 7,503,162, shows an example of a knife arrangement, the mower knife blades being mounted on a mower knife back and being oscillated transversal to the direction of feed of the material to be cut. Such knife arrangements are preferably used for mowers for grass and grain. To avoid misunderstandings, it should be pointed out that regarding such mowers the term "knife" may refer to the arrangement of multiple mower knife blades on the mower knife back. In other machines, individual blades are also referred to as knives.

European patent application EP 3 420 804 A1 (corresponding to U.S. patent publication No. 2019/0000018), for example, shows a chopping knife for straw choppers, the chopping knives having toothed cutting edges. The chopping knives are mounted on a rotor by means of mounting cut-outs and associated mounting elements in order to be mounted in an oscillating manner. Straw choppers of this kind serve to chop the straw of a combine harvester, for example.

International patent disclosure WO 2018/024854 A1 (corresponding to U.S. patent publication No. 2019/0262919) shows the design of a knife for corn headers as they are used in corn harvesters.

U.S. Pat. No. 5,823,449 shows knives for the use in feed mixers. Published, non-prosecuted German patent application DE 10 2013 007 302 A1 shows the use of knives for a cutting device for harvesters, such as loader wagons or balers, for example.

All these mentioned exemplary blades and knives have in common that they each have at least one or two toothed cutting edges on a blade surface, the cutting edges having a straight or curved configuration. Further, the blade surfaces each have a mounting section in order to fix the knives or mount them on a movement device. The movement of the knife arrangements is either linearly oscillating, rotatory with one or two directions of rotation oscillating or arc-shaped. Loader wagon knives and baler knives may also be arranged in a stationary manner.

What all these knives have in common is that the cutting edges are toothed in order to guarantee the best cutting performance possible. According to the state of the art, such knife blades are configured to be as wear-resistant as possible in order to increase durability. By taking suitable measures, a self-sharpening effect may be achieved at the cutting edges by combining hardened surfaces with slightly softer metal surfaces, as is known from the state of the art as well.

In accordance with the state of the art, the cutting edges are uniformly toothed along their entire length in each of these cases, i.e. they are provided with the same tooth pitch per unit of length (usually tpi=teeth per inch) and the same tooth geometry throughout.

Regarding the tooth pitch it is to be understood that its value, i.e. the tpi-value, increases as the fineness of the toothing increases. As the tpi-value decreases, i.e. as the fineness decreases, the tooth pitch decreases and the toothing becomes coarser. The tooth pitch is not to be confused with the term "tooth spacing", which usually defines the distance between one tooth tip and the next. The bigger the tooth pitch, the smaller the tooth spacing.

The design of the knife blades and their cutting edges may be very diverse and is adapted depending on the material to be cut. When mowing grass and fine stalks, a fine toothing of the cutting edges is preferred, while a coarse toothing of the cutting edges is necessary for materials with coarser stalks, such as corn. The design of the toothing also influences the speed of movement during mowing.

In practice, this means for the operator of the machine that he has to use different knives and blades depending on the crop or the material to be cut. For the operator of the machine, but also for the manufacturer and distributor, this means an increased effort with regard to manufacture, assembly, distribution and storage.

From the state of the art, cutting edges with two different types of toothing are known as well, wherein one section of the cutting edge has a finer toothing and the second section has a coarser toothing. However, this entails certain disadvantages. At the transition from one tooth height to the next, the material to be cut might get jammed. Abrupt changes in the design of the blade increase the risk of breakage. Furthermore, blades with two or more sections of a different tooth height, tooth spacing or tooth geometry cannot be used universally for every material to be mown.

BRIEF SUMMARY OF THE INVENTION

The object of the present invention is to provide all types of knives, such as the ones mentioned above, with the possibility of making the cutting behavior of the knives more universal so that they can be used to process different materials without having to change the knives and blades.

The invention is characterized in that the toothing of the cutting edge is varied along its length with regard to the tooth pitch and/or the tooth geometry.

According to another preferred feature, the toothing is continuously varied.

A continuous variation means that the tooth pitch increases or decreases from tooth to tooth or that the tooth geometry differs from tooth to tooth along the length or along a section of the length of the cutting edge.

Other features which are considered as characteristic for the invention are set forth in the appended claims.

Although the invention is illustrated and described herein as embodied in blades and knives for agricultural machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
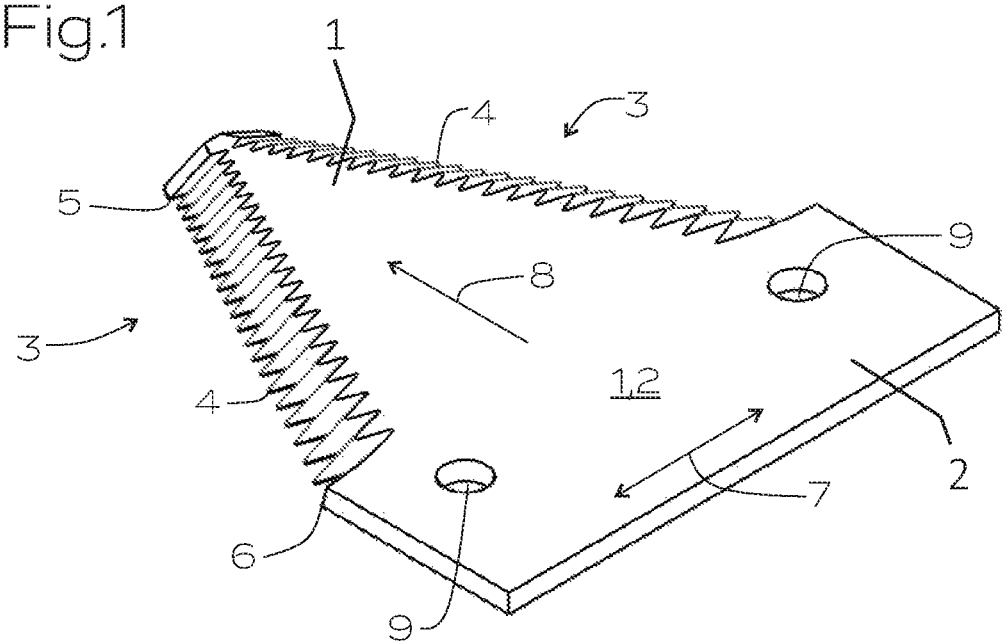
FIG. 1 is a diagrammatic, perspective, slanted view of a mower knife blade according to the invention.

Referring now to the figures of the drawings in detail and first, particularly to FIG. 1 thereof, there is shown an inventive mower knife blade that may be used in finger cutting devices for combine harvesters and other mowers. A blade surface 1 contains a mounting section 2 with cut-outs 9, by means of which the mower knife blade can be mounted on a mower knife back, for example, e. g. by means of screws or rivets. On the two tapered edges the mower knife blade is further provided with the cutting edges 3. The cutting edges 3 are given a toothing by machining in teeth 4. The toothing may be machined in with different process technologies, e.g. by coining or milling. In accordance with the state of the art, the cutting edges 3 may be hardened or provided with hardened layers.

According to the invention, the toothing of each cutting edge 3 is varied along its length with regard to the tooth pitch. The tooth pitch decreases from the cutting edge beginning 5 to the cutting-edge end 6. This means that the tooth pitch is fine at the cutting edge beginning 5 and becomes coarser towards the cutting-edge end 6. This corresponds to the diagrammatic view of FIG. 7A. In accordance with international customs, the diagram shows the tpi (short for "teeth per inch"). The higher this number, the finer the toothing. Usual tpi-values are, for example, 14 to 7, which corresponds to a tooth spacing of 1.8 to 3.6 mm.

With regard to the tooth pitch "variation along the entire length of the cutting edge" means that the spacing between the teeth differs in each case, i.e. no distances from one tooth to another on one cutting edge are the same.

This variation of the toothing along the cutting edge length offers the desired inventive advantage that different stalked material can be mown. The direction of movement of the mower knife blade is indicated with 7 and the direction of movement of the mower knife blade through the material to be cut is indicated with 8. If the material to be cut requires a fine toothing, the fine-pitched section of the mower knife blade is employed. However, if coarse-stalked material is to be cut, the coarse-pitched section towards the cutting edge end 6 helps to make or finish a perfect cut.

FIGS. 7A-7F show further possibilities for variation with regard to the tooth pitch, for example. According to FIG. 7B, the tooth pitch may also increase, with the coarse section being located at the cutting edge beginning 5 and the pitch increasing continuously towards the cutting edge end 6.

Figure 7A:
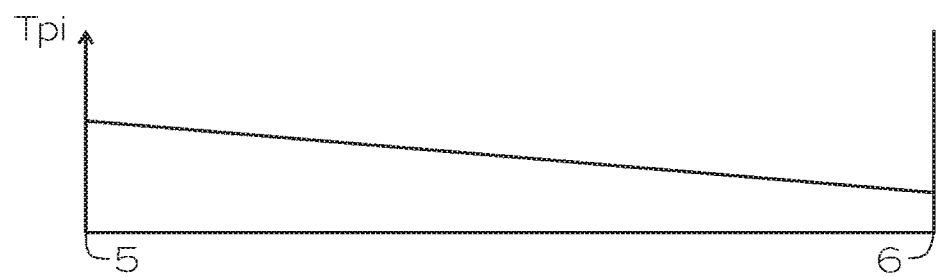
FIGS. 7A-7F are diagrams showing different possibilities for variation of the tooth pitch of the cutting edges of the knives.
Figure 7B:
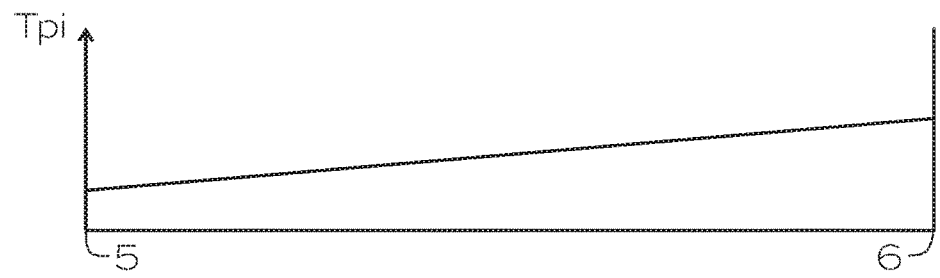
Figure 7C:
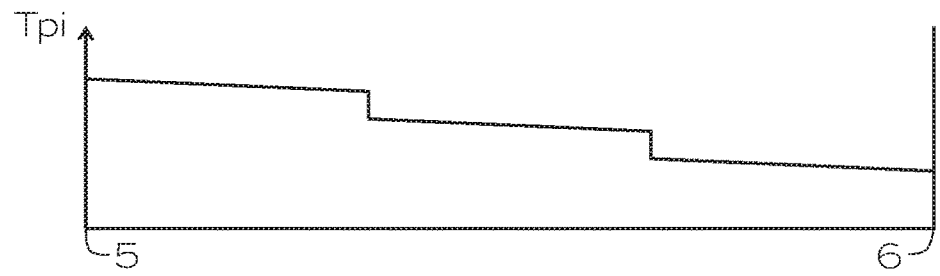
Figure 7D:
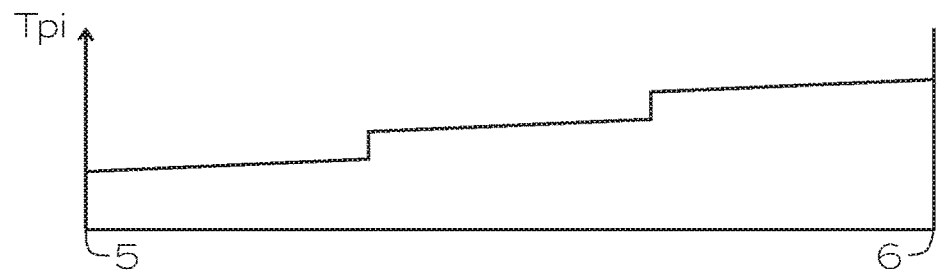

According to FIGS. 7C and 7D, the pitch may be continuously varied from section to section, e.g. according to FIG. 7C with a decreasing fineness and according to FIG. 7D with an increasing fineness.

Figure 7E:
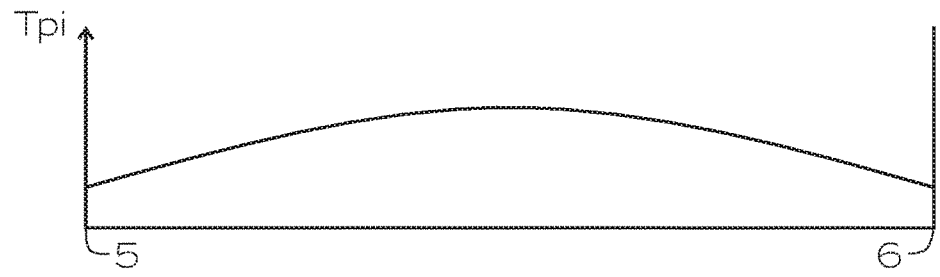
Figure 7F:
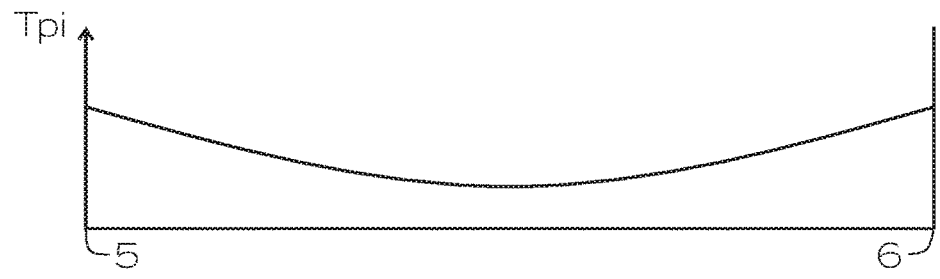

According to the variation of FIG. 7E, the tooth pitch may also increase from a low value at the cutting edge beginning 5 and then decrease again or, contrary to this, it may have a higher fineness at the beginning, which decreases along the cutting edge 3 and then increases again towards the cutting edge end 6, as shown in FIG. 7F.

All these possibilities for variation are only exemplary and are intended to show that a variation along the cutting edges 3 is advantageously possible according to the present invention.

Figure 2:
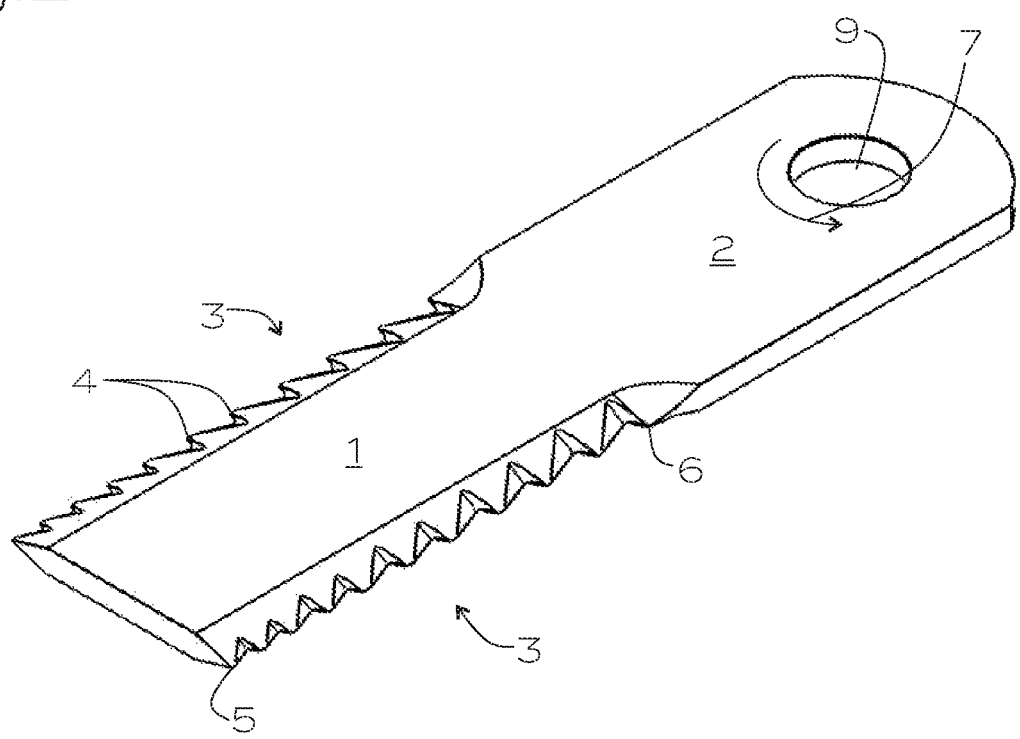
FIG. 2 is a perspective slanted view of a straw chopper knife.

FIG. 2 shows a straw chopper knife, as it may be used in straw choppers for combine harvesters, for example. These straw chopper knives are mounted on the mounting section 2 in a rotatable or pivotable manner by a suspension, which is not shown. This cut-out 9 serves to receive a bolt, about which the knife may be pivoted in the direction of movement 7.

The shown straw chopper knife is also provided with a varied toothing from the cutting edge beginning 5 to the cutting edge end 6. The toothing shown corresponds to the variation in FIG. 7A. However, in the scope of the invention the other types of toothing according to FIGS. 7B to 7F may be provided as well, for example.

Figure 3:
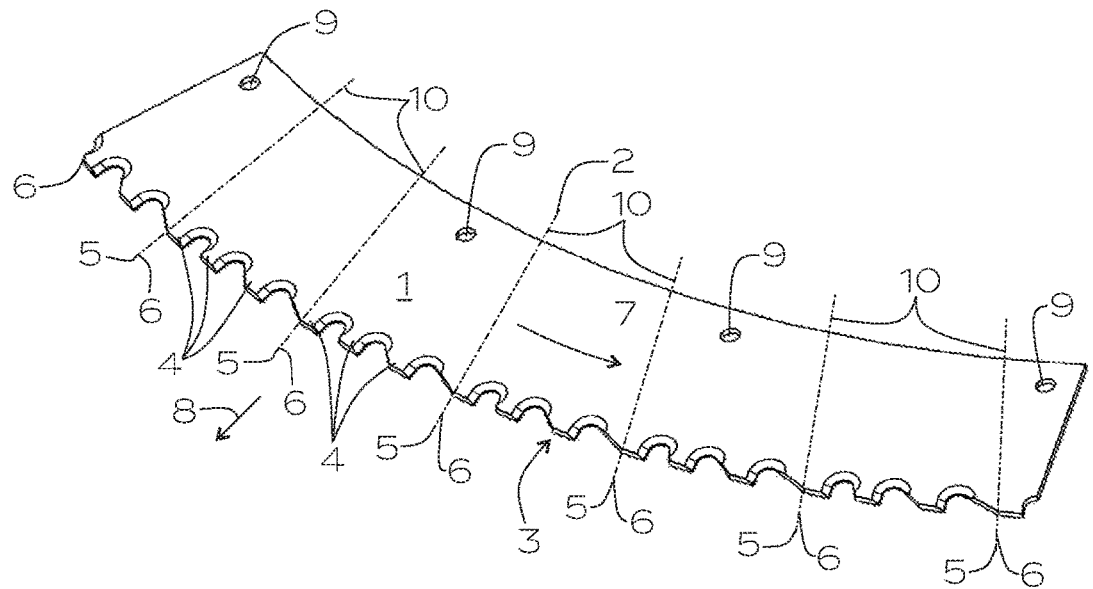
FIG. 3 is a perspective slanted view of a corn header knife.

FIG. 3 shows a corn header knife as it may be used in row-independent corn headers (mowing headers) for self-propelled forage harvesters, for example. Several of the shown knife segments are arranged on a circular disc in the direction of movement 7. In contrast to the above mentioned and described knives, this corn header knife has repeating sections 10 arranged along the cutting edge 3. Each section 10 has three different tooth pitches so that also this corn header knife offers the advantage according to the invention. Within the sections 10 the variation may be varied, for example according to the possibilities in FIGS. 7A to 7F. In the example of FIG. 3, six sections 10 with three teeth 4 each with increasing fineness are provided. Here, the direction of movement through the material to be cut is also indicated with 8.

Figure 4:
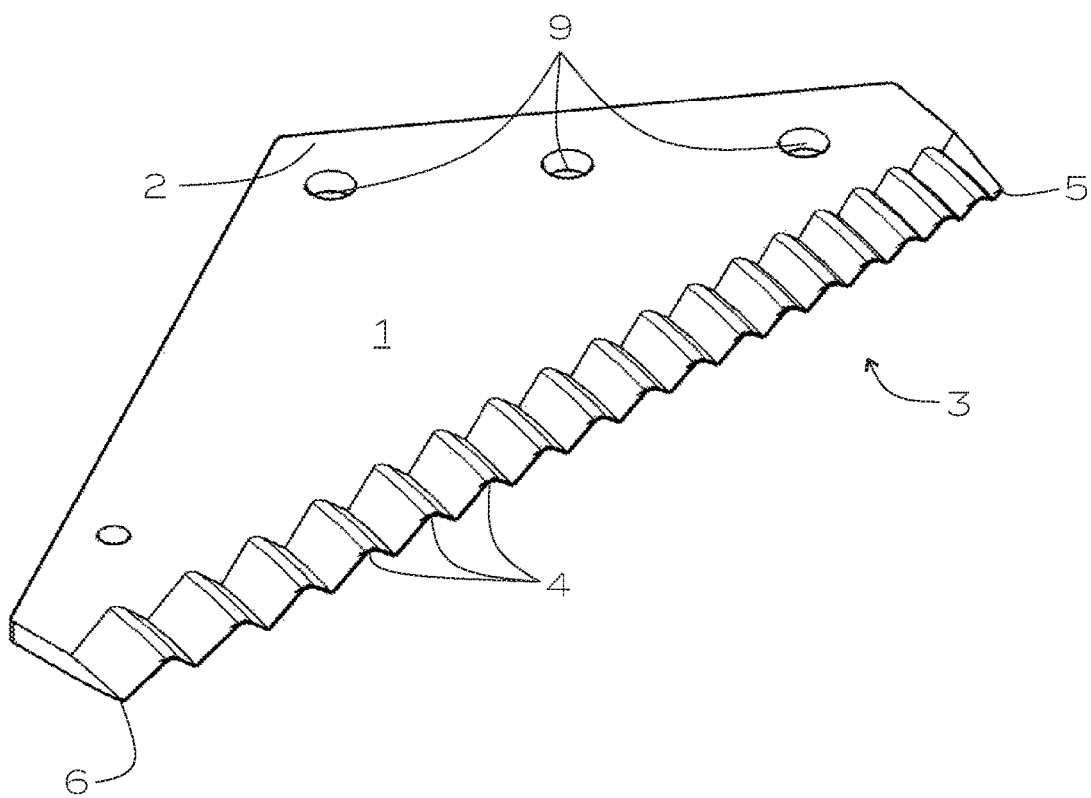
FIG. 4 is a perspective a slanted view of a feed mixer knife.

FIG. 4 shows a feed mixer knife according to the invention, the toothing of the cutting edge 3 being continuously varied as indicated by the variations according to FIG. 7A or FIG. 7B. Here, the other possibilities for variation according to FIG. 7C to FIG. 7F may be applied as well. In the variations according to FIGS. 7C and 7D, the toothing of the cutting edges changes abruptly, the variation of the toothing (tpi) continuously decreasing or increasing within each section.

Figure 5:
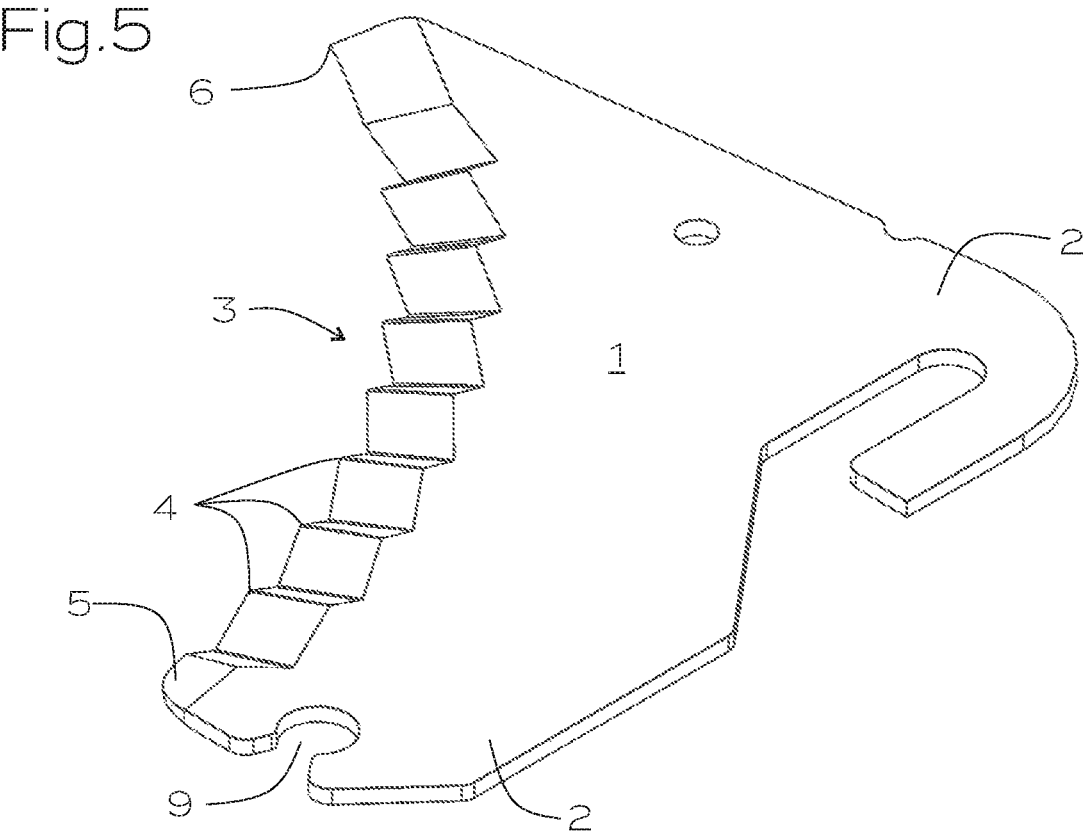
FIGS. 5 and 6 are perspective views of a loader wagon knife and baler knife in different variations.

FIG. 5 shows a loader wagon knife and baler knife according to the invention. As an example, this type of knife may be used to show that the variation may not only be provided by varying the tooth pitch, but also by varying the tooth geometry. As shown in the drawing, the tooth angle, i.e. the cutting angle of the leading edge, is varied. Even if the tooth pitch is kept the same, this allows the cutting behavior of each tooth 4 to be different in terms of aggressiveness. This type of variation is also possible for all the other cutting blades that are shown and not shown, which guarantees a very wide range of applications for the knife.

Figure 6:
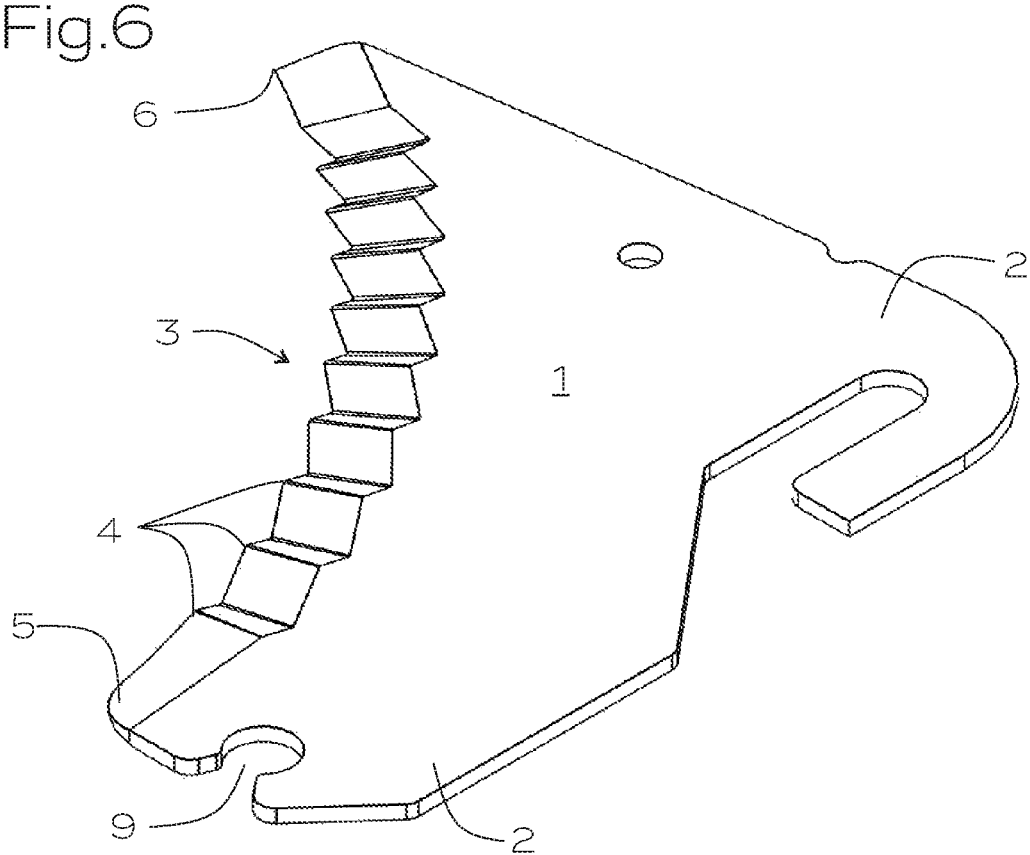

FIG. 6 also shows a loader wagon knife and baler knife, the toothing of the cutting edge 3 of which is varied with regard to its tooth pitch and tooth geometry.

Figure 8A:
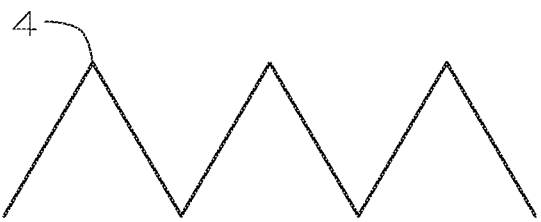
FIGS. 8A-8E are illustrations showing multiple examples for variations of the tooth geometry.
Figure 8B:
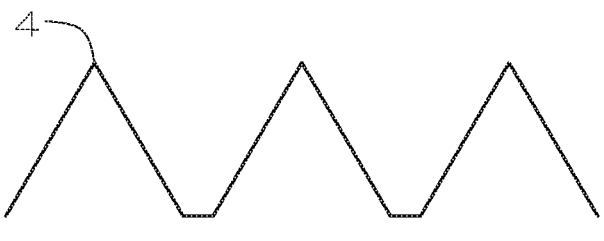
Figure 8C:
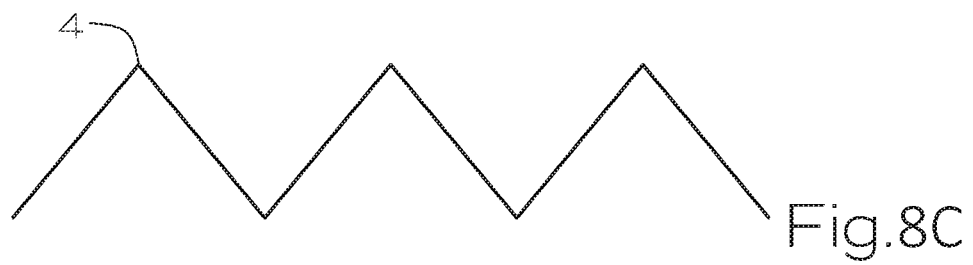
Figure 8D:
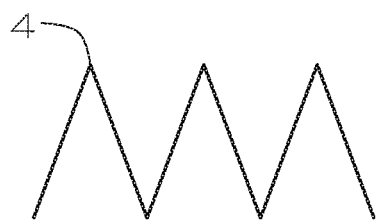
Figure 8E:
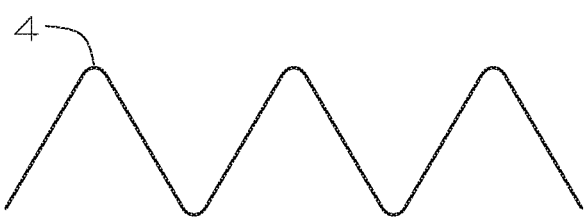

Some of the possibilities for variation of the tooth geometry are shown as examples in FIGS. 8A-8E, which must not be interpreted as limiting. The variation in FIG. 8A and FIG. 8C varies continuously along the knife according to FIG. 5. The variation is possible with regard to tooth width, tooth height, tooth angle and/or sharpness of the tooth tip (FIG. 8E). According to FIG. 6, a combination of the possibilities for variation is also feasible.

It must be noted that the drawn variations with regard to the individual types of knives must not be interpreted as limiting. All variations may be applied to all types of knives and may be combined as desired with regard to the variation of the tooth pitch and the variation of the tooth geometry.

The following is a summary list of reference numerals and the corresponding structure used in the above description of the invention:

1 Blade surface
2 Mounting section
3 Cutting edge
4 Tooth
5 Cutting edge beginning
6 Cutting edge end
7 Direction of movement
8 Direction of movement
9 Cut-out
10 Section

The invention claimed is:

1. A knife and blade for agricultural machines, the knife and blade comprising:
   a blade surface having a mounting section; and
   at least one toothed cutting edge extending from a cutting edge beginning to a cutting edge end on said blade surface, said at least one toothed cutting edge having a straight or curved configuration, said at least one toothed cutting edge having a toothing being varied along its length with regard to a tooth pitch and/or a tooth geometry, wherein:
   the tooth pitch is configured to decrease continuously at a constant rate of change from said cutting edge beginning toward said cutting edge end; or
   the tooth pitch is configured to increase continuously at a constant rate of change from said cutting edge beginning towards said cutting edge end.

2. The knife and blade according to claim 1, wherein said tooth geometry is varied with regard to tooth width, tooth height, tooth angle and/or sharpness of a tooth tip.

3. The knife and blade according to claim 1, wherein the knife and blade is selected from the group consisting of mower knife blades, straw chopper knives, corn header knives, feed mixer knives, loader wagon knives and baler knives.

* * * * *